United States Patent [19]

Benesch

[11] Patent Number: 4,921,193

[45] Date of Patent: May 1, 1990

[54] BREAK APART STAND FOR PLASTIC BAGS

[76] Inventor: Maurice C. Benesch, 7847 Vervain Ct., Springfield, Va. 22152

[21] Appl. No.: 361,956

[22] Filed: Jun. 6, 1989

[51] Int. Cl.⁵ ............................................ A63B 55/04
[52] U.S. Cl. ...................................... 248/97; 248/99; 403/246
[58] Field of Search .................... 248/95, 97, 99, 100, 248/101, 153; 141/314, 391; 220/404; 403/246, 245

[56] References Cited

U.S. PATENT DOCUMENTS

| | | | |
|---|---|---|---|
| 4,199,122 | 4/1980 | Christie | 248/97 |
| 4,364,534 | 12/1982 | Valesko | 248/97 |
| 4,461,441 | 7/1984 | Briggs | 248/97 X |
| 4,469,300 | 9/1984 | Valesko | 248/97 |
| 4,723,743 | 2/1988 | Jenkins | 248/97 |
| 4,750,694 | 6/1988 | Bateman | 248/97 |

Primary Examiner—Ramon O. Ramirez
Attorney, Agent, or Firm—Rodger H. Flagg

[57] ABSTRACT

A break apart stand for supporting plastic bags comprising two elongated base portions in parallel alignment having a hooking end disposed at each distal end with an aperture disposed in each hooking end, and opposing upright supports having a bottom portion and side portions extending from the bottom portions. Each of the upright bottom portions having a raised pin to be closely received within the aperture disposed in the hooking end of the elongated base portions.

20 Claims, 5 Drawing Sheets

BREAK APART STAND FOR PLASTIC BAGS

BACKGROUND OF THE INVENTION

1. Field of the Invention

This invention relates to a break apart stand for supporting plastic bags in an open position, for ease of loading and unloading objects from the plastic bag. More specifically, this invention relates to a break apart stand having opposing upright supports and base portions extending between the upright supports.

The upright support has a bottom portion with side portions extending from each end of the bottom portion, and a top portion extending between the side portions. The top portion is formed to receive and support the handle of a plastic bag thereon.

The base portions have hooking ends with apertures sized to closely receive raised pin portions extending from the bottom portion of the opposing upright supports, to form a break apart stand for supporting a plastic bag with handles in an open position.

The break apart stand may serve as a self supporting stand for supporting a plastic bag, or may serve as an insert for a wastebasket or trash receptacle to support the plastic bag in an open position within the wastebasket or receptacle during use.

Many grocery stores, drug stores and other retail businesses have switched from paper bags to plastic bags, or are in the process of doing so. Plastic bags have several inherent advantages over paper bags, such as providing bags with handles, providing improved tear strength, and providing improved moisture resistance Plastic bags also have several inherent disadvantages, such as their inability to stand up unsupported, their difficulty to fold and store, their lack of bio-degradability, and their impracticality for reuse. The present invention is directed towards solving problems relating to the inability of plastic bags to stand up unsupported and their impracticality for reuse.

2. Description of the Prior Art

U.S. Pat. Nos. 4,467,989; 4,469,300 and 4,364,534 relate to collapsible wire racks for supporting plastic bags. The square base and side configurations restrict their use for insertion into standard waste containers which typically have tapered sides expanding towards the container opening for ease of drawing the container from the mold during fabrication, and for ease of stacking the containers during transport and storage.

U.S. Pat. No. 3,687,408 discloses a foldable support for plastic bags in which a pin is inserted in an aperture in the base to support the sides from the base. The sides and base are hinged to foldably guide the pin into the aperture provided.

BRIEF DESCRIPTION OF THE INVENTION

The break apart stand for plastic bags overcomes the difficulties of the prior art by providing tapered upright supports having inclined sides sized to be readily received in a standard waste basket of a size suitable to hold the plastic bag. The break apart stand separates into relatively flat components for ease of transport or storage, may be quickly assembled or disassembled without tools, and may be used as a stand alone support for plastic bags with handles.

Alternately, the break apart stand may be inserted within an existing waste container or receptacle, with a plastic bag suitably installed upon the break apart stand.

One object of this invention is to provide an improved break apart stand for supporting plastic bags with handles.

Another object of this invention is to provide an improved break apart stand that may be assembled or disassembled without tools.

Another object of this invention is to provide an improved break apart stand having a tapered profile for ease of insertion within a tapered waste basket, container or receptacle.

Another object of this invention is to provide an improved break apart stand having a relatively narrow profile when disassembled for ease of storage and transport.

Yet another object of this invention is to provide raised pins and complimentary apertures which are asymmetrical to ensure proper assembly of the upright supports and the base portion.

Still another object of this invention is to provide a break apart stand for plastic bags in accordance with the preceding objects that is easy and economical to manufacture, is of simple construction, is durable, and corrosion resistant.

Other objects and features of the present invention will become apparent from a consideration of the following description which proceeds with reference to the accompanying drawings, wherein example embodiments of the invention are selected by way of illustration and not by way of restriction.

DETAILED DESCRIPTION OF THE DRAWINGS

FIG. I is a perspective view of the assembled break apart stand of this invention.

DETAILED DESCRIPTION OF THE INVENTION

Figure 1:
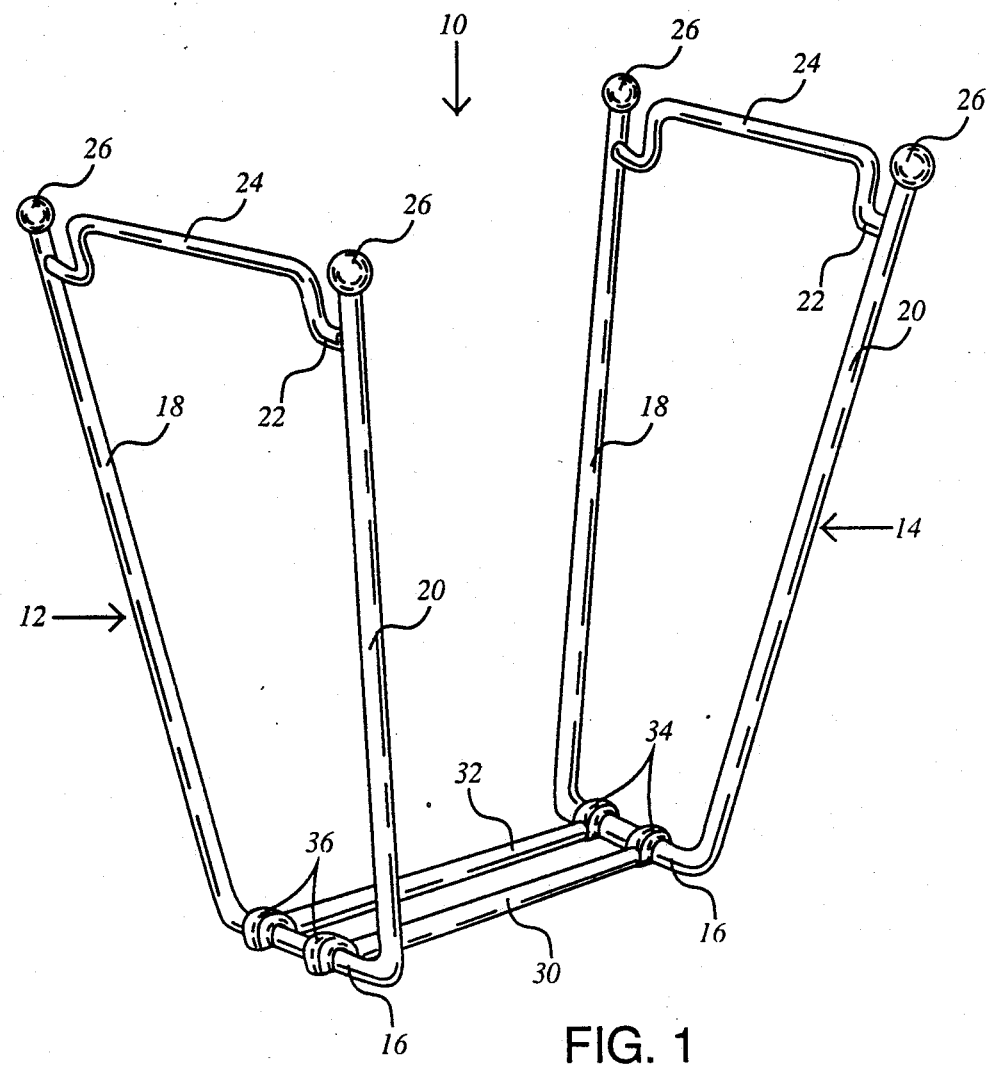

Referring now more specifically to FIG. 1, which shows the break apart stand 10 assembled in preparation for insertion of a plastic bag thereon. The opposed upright supports 12, 14 each have a bottom portion 16, with side portions 18, 20 extending from each end of the bottom portion 16. A top portion 22 extends between the side portions 18, 20. Top portion 22 is formed with a raised handle portion 24 sized to receive and support the handle of a plastic bag thereon.

Preferably, side portions 18, 20 extend beyond top portion 22 to form an enlarged spherical end 26. Spherical end 26 serves to aid in gripping the stand 10 for ease of guiding the handle portion of the plastic bag over the raised handle portion 24.

FIG. 1, 2, 4 and 5 show two elongated base portions 30, 32 having a hooking end 34, 36 disposed at the distal ends of base portion 30, 32. Base portions 30, 32 are preferably identical and interchangeable for ease of manufacture and assembly.

Figure 4:
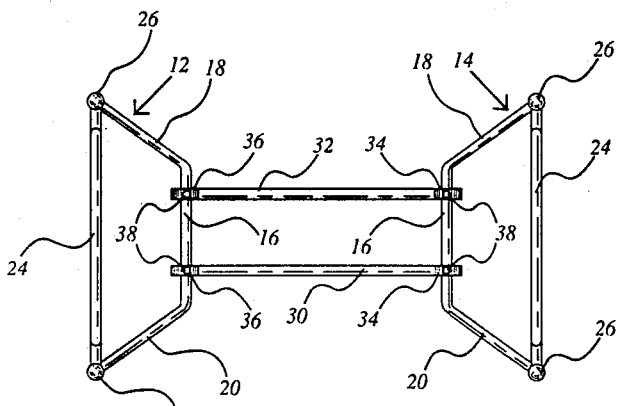
FIG. 4 is a top elevation view of the assembled break apart stand shown in FIG. 1.

While two elongated base portions 30, 32 are shown in FIGS. 1 and 4, it is within the scope of this invention to provide more than two base portions without departing from the spirit of this disclosure, nor from the scope of the following claims.

The opposing upright supports 12, 14 are symmetrically designed to be identical and interchangeable for ease of manufacture and assembly. The upright supports 12, 14 are preferably manufactured of a resilient material to impart a springing actuation to aid in holding the plastic bag apart during use.

The base portions 30, 32 and upright supports 12, 14 are preferably fabricated of a moldable, non-metallic material for ease of manufacture, and to improve corrosion resistance.

Figure 3:
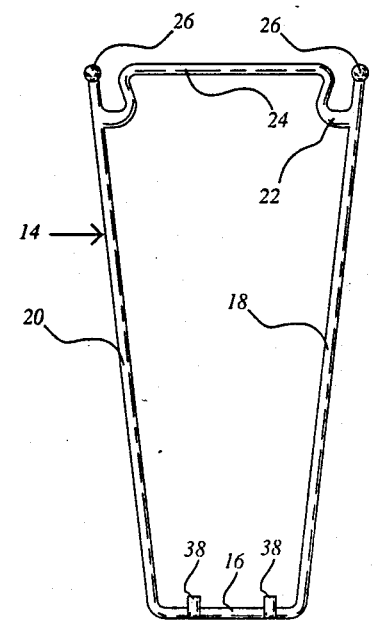
FIGS. 3 and 6 are side elevation views of the upright supports.
Figures 5, 6:
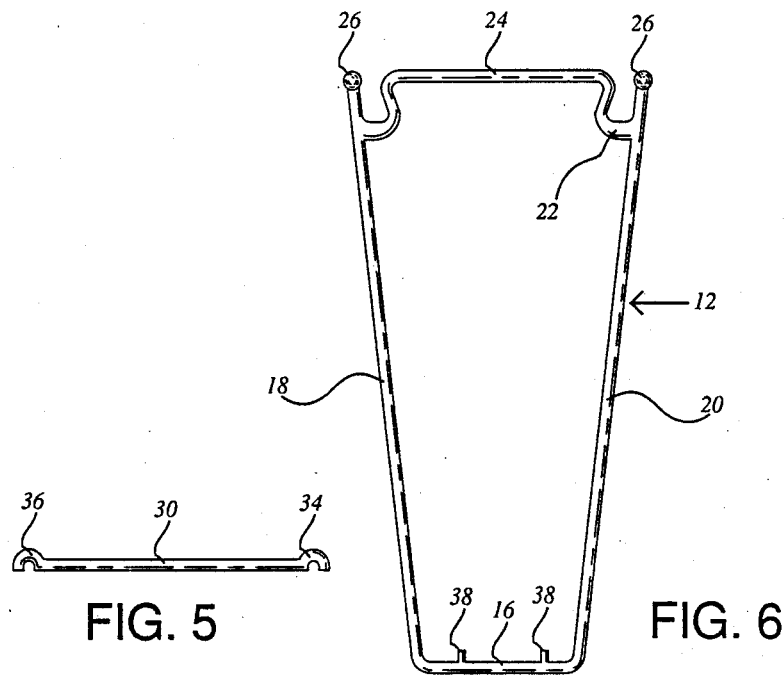
FIG. 5 is a front elevation view of the base portion.

Referring now to FIGS. 3 and 6, the opposing upright supports 12, 14 are preferably inclined wherein the bottom portion 16 is of a smaller width than the top portion 22, to aid in insertion of the upright supports within an existing tapered trash container (not shown).

The use of the term container in the specification and claims is intended to be broadly interpreted, to include waste baskets, containers, receptacles, and other apparatus for collecting, storing or transporting refuse, such as paper, garbage, and other discarded articles.

The bottom portion 16 of the upright supports 12, 14 preferably each have at least two raised pin portions 38 extending therefrom. The raised pin portion 38 is preferably sized to be closely received within an aperture 40 disposed in the hooking end 34, 36 of the elongated base 30, 32.

Alternately, the raised pin portion 38 may extend from the hooking end 34, 36 of base 30, 32 and the aperture 40 may be disposed in the bottom portion 16 of the upright supports 12, 14. (not shown).

Preferably, the complimentary raised pin portion 38 and aperture 40 are asymmetrical to ensure proper assembly without requiring external fasteners, detailed instructions or tools.

Figure 2:
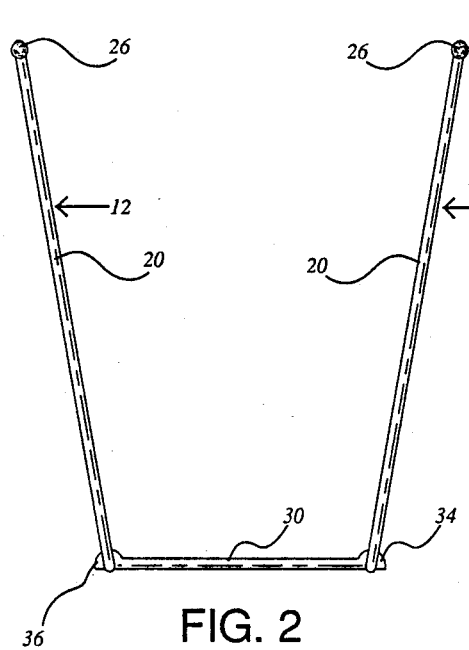
FIG. 2 is a front elevation view of FIG. 1, showing the inclined upright supports extending from the base portion
Figures 7, 8:
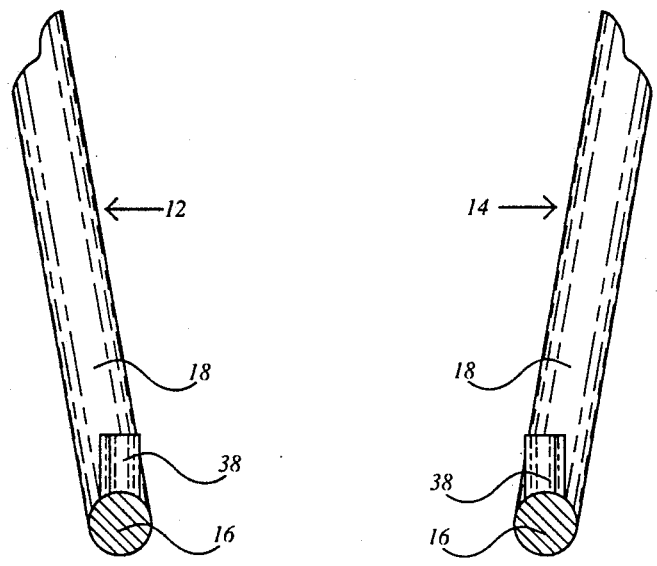
FIG. 7 and 8 are cross sectional views of the bottom portion of the upright support showing the raised pin portion.

FIGS. 7 and 8 show the raised pin portion 38 to be preferably slightly inclined in relation to side 18 of upright support 12, 14, to insure that upon assembly upright supports 12, 14 will be slightly inclined as shown in FIGS. 2 and 4. This incline ensures that the upper width between handle portions 24 will be wider than the base portions 30, 32 for ease of insertion of the assembled stand 10 into a suitable container.

The incline between the raised pin portion 38 and side 18 of upright support 12 is preferably greater than one degree and less than 15 degrees. Most preferably, the incline is between one and one-half degrees and six degrees.

Alternately, the same results may be achieved by providing raised pin portions 38 in alignment with side portion 18 of upright support 12, and complimentary apertures 40 suitably inclined in hooking ends 34, 36 to produce similar results. Such modifications are intended to fall within the scope of the following claims.

Raised pin portion 38 and complimentary aperture 40 are preferably asymmetrical for ease of assembly. The raised pin portion 38 and complimentary aperture 40 may be of any geometric shape, and are shown to be square in FIGS. 9 and 11, by way of example.

Figure 9:
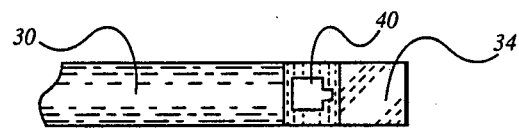
FIG. 9 and 11 are partial top views of the base portion hooking end, showing an asymmetrical aperture therethrough.
Figure 11:
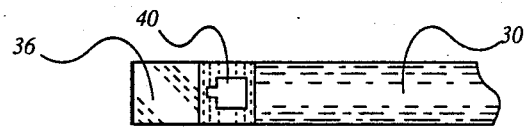

A keyway 41 is shown adjacent to aperture 40 in FIGS. 9 and 11. Complimentary key 43 adjacent to raised pin portion 38 serves to ensure that the upright supports 12, 14 will not be accidentally assembled wherein the handle portion 24 is closer together than the base portion 30, 32.

In the preferred embodiment, the assembled stand apparatus 10 forms an inverted trapezoid configuration wherein the bottom portion is smaller than the top portion along both the front, rear and sides of stand 10. This ensures that stand 10 may be properly sized to be closely received within the inverted trapezoid profile of an existing trash container or receptacle found in the home or office.

Figure 10:
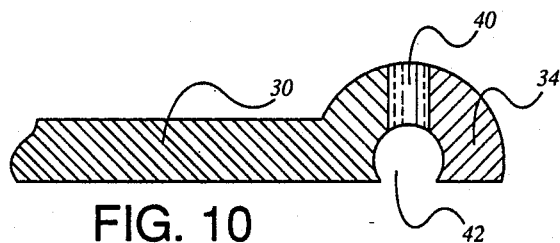
FIGS. 10 and 12 show a partial cross sectional view of the hooking end shown in FIGS. 9 and 11.
Figure 12:
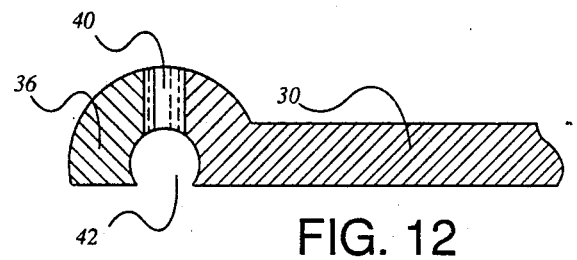

As best shown in FIGS. 10 and 12, the hooking end 34, 36 of each base portion 30, 32 has a partial cylindrical opening 42 sized to closely receive the cross sectional profile of the bottom portion 16 of the upright support 12, 14. Thus, upon assembly, the upright supports 12, 14 are rigidly supported by elongated base portions 30, 32, without requiring external fasteners, tools or elaborate assembly procedures.

If the raised pin portion 38 is not properly positioned in relation to complimentary aperture 40, it simply will not fit. Upon proper alignment of raised pin portion 38 and aperture 40, the parts are easily assembled in proper relation to produce an inverted trapezoid configuration suitable for stand alone use, or for insertion within an existing trash container.

Figure 13:
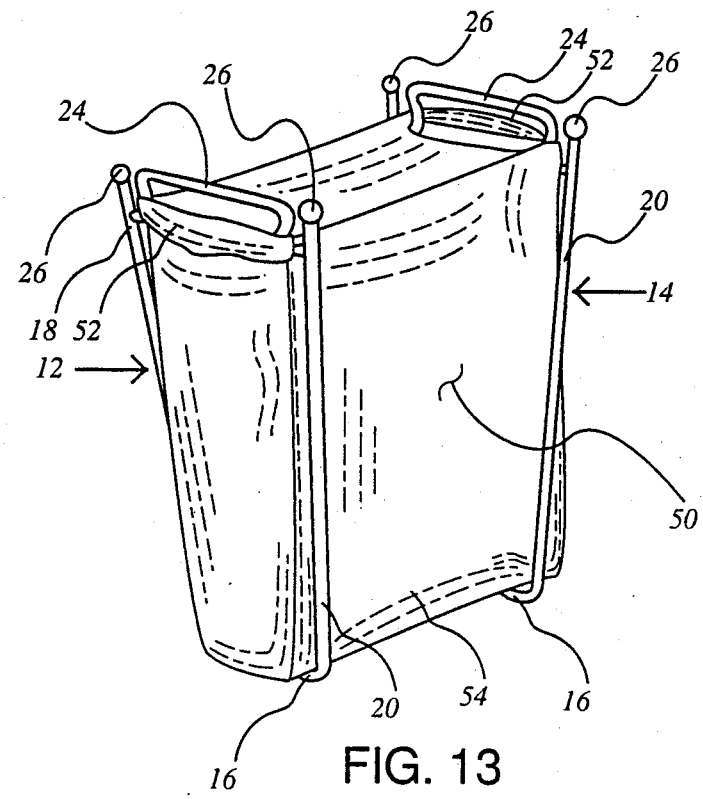
FIG. 13 is a perspective view of the break apart stand with a plastic bag installed thereon.

FIG. 13 shows the assembled stand 10, with a plastic bag 50 disposed thereon. The plastic bag handles 52 are placed over raised handle portion 24 of upright supports 12, 14 to position the open bag 50 upon the stand 10. Preferably, the stand 10 is sized to receive a plastic bag 50 wherein the bottom of the bag 54 is supported by base portions 30, 32 extending between the upright supports 12, 14. The base portions 30, 32 serve to reduce the weight carried by the bag handles 52 and the stand 10 during use, while supporting the bottom of the bag should the stand be lifted by handles 24 while trash is present in the plastic bag.

In operation, the break apart stand 10 is assembled by aligning the hooking end 34, 36 upon the bottom portion 16 of first one and then the other of the upright supports 12, 14, and inserting the raised pin 38 through aperture 40. The asymmetrical configuration of raised pin 38 and complimentary aperture 40 ensures that the stand will be properly assembled.

A plastic bag 50 is then positioned between upright supports 12, 14, and each handle 52 on bag 50 is slidably positioned upon raised handle portion 24 of upright supports 12, 14. Spherical ball 26 may be grasped by the user during insertion of the handle 52 of the plastic bag 50 about the raised handle portion 24 of upright supports 12, 14.

The entire break apart stand assembly 10 may be moved to a convenient location without worrying about inadvertent disassembly. Where it is desired to place the stand assembly 10 within an existing container, (not shown), the stand assembly 10 may be inserted within a container, due to the inverted trapezoid configuration of the brake apart stand 10.

To disassemble the break apart stand 10 for ease of transport or storage, simply separate the upright supports 12, 14 from the base portions 30, 32, which separates the raised pins 38 from the complimentary apertures 40. The upright supports 12, 14 and base portions 30, 32 may then be stored or shipped in a suitable package.

Although the present invention has been illustrated and described in connection with certain example embodiments, it will be understood that these embodiments are selective and are exemplary of the invention and are not intended to be restrictive thereof.

It is to be reasonably expected that those skilled in this art can make numerous revisions and adaptations of the invention, and it is intended that such revisions and adaptations be construed as being within the limits of the scope of the accompanying claims.

I claim:

1. A break apart stand apparatus for supporting plastic bags with handles, which comprises:
   (a) at least two elongated base portions disposed in parallel spaced alignment, each base portion having a hooking end disposed at each distal end, with an aperture disposed in each hooking end;
   (b) opposing upright supports having a bottom portion, with side portions extending from each end of the bottom portion, and a top portion extending between the side portions and formed with a raised handle portion sized to receive and support the handle of a plastic bag thereon: each opposing upright support further having at least two raised pin portions extending from the bottom portion and sized to be closely received within the aperture disposed in the hooking end of the elongated base portion, wherein the break apart stand is assembled by inserting the raised pin portions extending from the bottom of the opposed upright supports through the apertures provided in the hooking end of the elongated base portions.

2. The apparatus of claim 1, wherein the raised pins are disposed upon the bottom portion of the upright supports at an angle greater than 90 degrees from the assembled base portion, to position the opposed upright supports at an inclined angle from the base with the top portion spaced further apart from the opposed upright support than the base portion of the opposed upright support.

3. The apparatus of claim 1, wherein each upright support has side portions extending above the top portion, with a spherical end disposed thereon for ease of gripping the spherical end to aid in insertion of the plastic bag handle portion about the raised handle portion of the upright support.

4. The apparatus of claim 1, wherein the aperture disposed in each hooking end of the base portion is formed as an asymmetrical aperture, and the raised pin portion extending from the bottom portion of the upright supports are formed as asymmetrical pin portions, sized to be closely received within the asymmetrical apertures disposed in the hooking end of the elongated base portion.

5. The apparatus of claim 4, wherein a keyway adjacent to the aperture and a complimentary key adjacent to the raised pin portion assure proper alignment at assembly.

6. The apparatus of claim 1, wherein the opposing upright supports have a bottom portion of a smaller width than the top portion of the upright supports.

7. The apparatus of claim 1, wherein the opposed upright supports are inclined inwardly towards the base portion to form an inverted trapezoid configuration for ease of insertion of the apparatus within a suitably container.

8. The apparatus of claim 1, wherein the opposed upright supports are fabricated of a resilient material to impart a springing actuation to aid in holding the plastic bag apart during use, when the plastic bag is inserted upon the raised handle portion of the upright supports.

9. The apparatus of claim 1, wherein the base portions and the upright supports are fabricated of a non-metallic material to improve corrosion resistance during repeated use.

10. A break apart stand apparatus for supporting a plastic bag with handles, which comprises:
    (a) at least two elongated base portions disposed in parallel spaced alignment, each base portion having a hooking end disposed at the distal end of each base portion;
    (b) opposing upright supports having a horizontal bottom portion, upwardly inclining spaced side portions extending from the base portion, with a top portion formed with a raised handle portion extending between the side portions, the top portion of a width greater than the bottom portion, thereby forming an upright support having an inverted trapezoid configuration; and
    (c) a means to secure the base portion to the bottom of the upright supports in an inclined configuration wherein the distance spanned between the top portion of the upright supports is greater than the distance between the bottom portion of the upright supports, thereby forming an inverted trapezoid configuration between the opposing upright supports.

11. The apparatus of claim 10, wherein the means to secure the base portion to the bottom of the upright supports comprises an aperture disposed in the bottom portion of the opposed upright supports, and a raised pin portion disposed upon the hooking end of the elongated base.

12. The apparatus of claim 10, wherein each upright support has side portions extending above the top portion, with a spherical end disposed thereon for ease of gripping to aid in insertion of the plastic bag handle portion about the raised handle portion of the upright support.

13. The apparatus of claim 10, wherein the means to secure the base portion to the bottom of the opposed upright supports comprised an aperture disposed in the hooking end of the base portion, and a raised pin portion extending from the bottom portion of the upright supports, the raised pin portion sized to be closely received within the aperture disposed in the hooking end of each elongated base portion.

14. The apparatus of claim 13, wherein the aperture is an asymmetrical aperture and the raised pin is a complimentary asymmetrical raised pin sized to be closely received within the asymmetrical aperture.

15. The apparatus of claim 10, wherein the opposed upright supports are fabricated of a resilient material to impart a springing actuation to aid in holding the plastic bag apart during use, when the plastic bag is inserted upon the raised handle portion of the upright supports.

16. The apparatus of claim 10, wherein the base portions and the upright supports are fabricated of a non-metallic material to improve corrosion resistance.

17. A break apart stand apparatus for supporting a plastic bag with handles, which comprises:

(a) two elongated base portions disposed in parallel spaced alignment, each base portion having a hooking end disposed at the distal end of each base portion;
(b) opposing upright supports having a horizontal bottom portion, upwardly inclining spaced side portions extending from the base portion, with a top portion formed with a raised handle portion extending between the side portions, thereby forming an upright support having an inverted trapezoid configuration with the upper top portion wider than the bottom portion;
(c) an asymmetrical pin portion extending from the bottom of the upright support; and
(d) an asymmetrical aperture portion disposed at each distal end of the elongated base portion, the aperture sized to closely receive the asymmetrical pin extending from the bottom of the upright support.

18. The apparatus of claim 17, wherein the raised pin portion is inclined in relation to the base portion in a manner to position the raised upright supports in an inverted trapezoid configuration with the raised top portions spaced apart farther than the bottom portion of the upright supports.

19. The apparatus of claim 17, wherein the opposed upright supports are fabricated of a non-metallic, resilient material to impart improved corrosion resistance and a springing actuation to the raised handle portion of the upright supports to aid in holding the bag apart during use, when the plastic bag is inserted upon the raised handle portion of the upright supports.

20. The apparatus of claim 17, wherein the break apart stand apparatus may be repeatedly assembled and disassembled for ease of storage and transport between use, without the aid of tools.

* * * * *